3,014,802
CARAMEL MALT CONFECTION AND PROCESS OF MAKING THE SAME

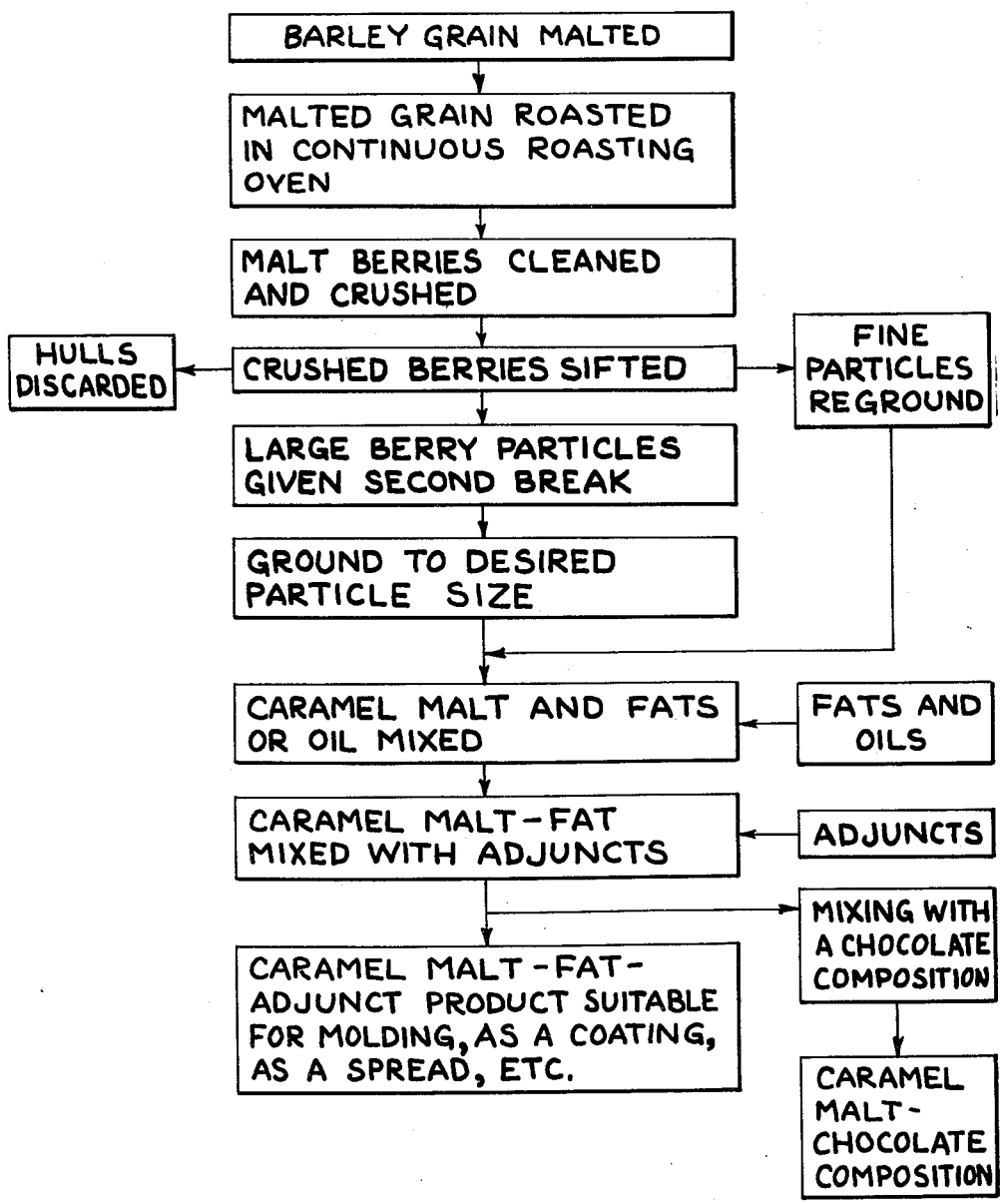

Nison N. Hellman and Dwight L. Baker, Milwaukee, Wis., assignors to Basic Products Corporation, Milwaukee, Wis., a corporation of Wisconsin
Filed Mar. 19, 1959, Ser. No. 800,543
4 Claims. (Cl. 99—134)

The present invention relates to compositions for use as confections, dip coatings and the like, and more particularly to caramel malt compositions finding particular but not exclusive use as coatings for candies, cookies, biscuits, and cereals, as confections for direct consumption as fragmented chips for baked goods, desserts and other food items, and as spreads, butters, and icings.

The principal object of the present invention is to provide a food composition having a new, unusual and distinctive flavor.

A more specific object of the present invention is to provide a confection composition containing a caramel malt product.

Another object of the present invention is to provide caramel malt containing coating compositions having a variety of new and distinctive flavors and which are suitable for use in coating candies, cookies, biscuits, cereals and the like.

Still another object of the present invention is to provide a combination caramel malt and chocolate confection which, depending upon the amount and type of caramel malt contained therein, has a flavor ranging from a distinctive chocolate-like flavor to one of a distinctive caramel malt flavor.

A further object of the present invention is to provide a caramel malt confection which is suitable for direct consumption as a candy.

Still a further object of the present invention is to provide confections of the foregoing type having a wide range of flavors and textures, ranging from soft mild butterscotch-like confections to firm mocha flavored confections.

Other objects and advantages of the present invention will become apparent as the following description proceeds taken in connection with the accompanying drawing, the single figure of which illustrates schematically the steps in preparing confections embodying the invention.

MANUFACTURE OF CARAMEL MALT OF GRADED FLAVOR INTENSITY

Malt is manufactured from the germination of grain, preferably barley, by methods such as are described in chapter II of "The Practical Brewer," published in 1947 by the Master Brewer's Association of America. The kilning process, however, is conducted in accordance with procedures familiar to those skilled in the art of producing caramel malts. Briefly, one method of producing caramel malts is accomplished by heating the barley malt berries in a continuous roasting oven similar to coffee roasters. The art of producing caramel malts is discussed in detail in "Brewing, Science and Practices" by H. Lloyd Hind, volume I, published by Chapman and Hall, Limited, in 1950, and "Biochemistry of Brewing," by I. A. Preece, published by Oliver and Boyd in 1954. In the caramelization process diastatic breakdown of malt starch occurs early in the roasting, followed by roasting at sufficiently high temperatures, with gelatinization of the starch and caramelization with a final roasting temperature in the range of from about 100° C. for producing light caramel malts to about 250° C. for producing dark caramel malts. The degree of caramelization of the malt can be characterized in terms of the color of malt flour produced when the malt berries are ground, one such color characteristic being conventionally referred to as the Lovibond color. In a Lovibond instrument, colored glass standards are matched against samples contained in glass cells.

The caramel malt product is characterized by very low diastatic activity, high dextrin content and gelatinized starch character. The high dextrin content associated with the caramel products has led to the light colored products (2–5° Lovibond) being called dextrin malts. The caramel malts to be employed in the confections described herein will range in Lovibond color units from about 2 to about 300° Lovibond. It has been found as a correlation to the Lovibond color, that the smaller the Lovibond number, the lighter the caramel malt and the milder its taste.

MILLING OF CARAMEL MALT TO A PARTICLE SIZE SUITABLE FOR FOOD APPLICATIONS

The caramel malt for use in the confections of the present invention is milled into a flour which is free from the hulls of the berry. To product a fine particle size malt which is free from hulls, the berries are mechanically extracted by a roller milling process comparable to that used in wheat milling technology. Such a process is described in "Baking, Science and Technology," vol. 1, chapter VIII, "Wheat Flour," by E. G. Pyler, published by Siebel Publishing Company, Chicago, Illinois (1952). Briefly, this process involves cleaning the berries in any suitable manner followed by passing them through break rolls which crush the malt. The crushed material then passes through a sifter which separates material according to size. The coarsest particles, composed of granular, unbroken berries and large fragments, are conveyed to a second breaker. The medium sized granular particles, consisting primarily of hulls, are discharged for by-product usage, while the finest particles yield the break flour which is further ground in reduction rolls to the desired particle size.

The repeated processes of grinding, sieving and separation, together with aspiration of hull fragments, is successively repeated until a fine malt product of the desired particle size and free from hull fragments is obtained. It has been found that the maximum fineness which can be achieved practically on a roller miller approximates 100% through a 100 mesh U.S. standard sieve, and 50% through a 150 mesh sieve.

CARAMEL MALT CONFECTIONS AND THE METHOD OF PRODUCING THEM

The confections of the present invention are produced by mixing a caramel malt flour with a fat or oil so as to produce a suspension of a flavorful malt in a fat or oil base. It has been found that, by employing a non-aqueous system as contrasted to an aqueous system, the grainy, grassy flavor notes of malt which appear in water based foods are suppressed while the nutty butterscotch and caramel flavor notes are emphasized. The particle size of the malt flour and the proportion of malt and fat is controlled by the end physical condition desired in the product. Neither is it practical to set forth in any great detail the proportions of ingredients to be used in any one instance because the final product must be judged entirely by its texture, taste, flavor, color, quality and other factors which are variables and depend entirely upon an individual's senses and preferences.

In the confection compositions embodying the present invention, the particle size to which the hull fiber free caramel malt product is prepared depends upon the end application for which it is intended. The primary purpose for any particle size adjustment is for the purpose of producing the desired feel of the product in one's mouth as well as the desired appearance and texture of the confection. There are other features under the influence of particle size, particularly those of product gloss, surface appearance, oil or fat requirements, and manufacturing procedures. It has been found that the following can be used as a general guide to particle size selection:

(1) Particles coarser than approximately 150 mesh are palpably granular in the mouth.

(2) Finer particle size is accompanied by higher viscosity for the same fat content.

(3) Particles greater than 40 mesh impart visible roughness.

(4) When malt fat systems are used in conjunction with other confections or baked goods the mouth feel of the coating should be related to that of the base.

For coatings for coarse products such as graham crackers and cookies, a fineness of grind, such as 95% passing through a 150 mesh screen and 90% passing through a 200 mesh screen would suffice, while for a very fine confection coating, the requirement might be 99% of the ground malt passing through a 200 mesh screen and 95% through a 325 mesh screen. Finely ground caramel malt materials generally require a regrinding of the roller mill product using appropriate grinding equipment such as micropulverizers, impact mills, air classifying mills, turbo mills and the like. This type of equipment is conventionally used in the flour, sugar and chocolate industries for production of fine particle size products. See for example U.S. Patent No. 2,356,181 relating to the grinding of chocolate products.

As pointed out above, the composition of the present invention is a basic system of caramel malt and an oil or fat. It has been found that approximately 22% of a fluid or plastic fat is required to aggregate the ground malt into a plastic mass. Fat contents greater than approximately 50% have generally been found to be distastefully greasy or fatty, although in some instances, such as where spreads are desired, the fat content can be increased to produce a product having the desired consistency. Fat contents of less than 10% have generally been found to be insufficient although it is conceivable that there may be some instances where such a small amount is desirable.

The amount of ground caramel malt employed will determine to a large extent the flavor of the product. While it is only necessary that a sufficient amount of the ground caramel malt be employed to impart the desired flavor, it can be generalized that an excess of 1% of ground caramel malt in a fat system is probably necessary in order to produce a noticeable flavor note.

Turning now to a general discussion of the flavor obtained in the confections, as pointed out above the malt flavor is affected by the degree of caramelization obtained in the kiln. One measure of flavor is the color of the caramel malt. Color is conveniently expressed in terms of Lovibond color degrees. It has been found that the blandest flavor, approaching in fact the effect of milk powder in chocolate confectionery bases, is obtained by using a light colored caramel malt, more specifically a caramel malt having a Lovibond color of approximately 2° Lovibond. On the other hand, a confection having a good mocha flavor can be achieved with malt having a 300° Lovibond color. The flavor change is continuous with the intensity increasing as color increases. The range of caramel malt flavors for formulation purposes can be evaluated by examining products made with caramel malt of 2°, 30°, 45°, 75° and 300° Lovibond color. The formulator is thus free to choose any of a wide range of non-diastatic dried caramel malt powders prepared to be hull fiber free by the above described dry extraction procedures. In addition to the malt color, it should be kept in mind that the quantity of malt to be used is primarily influenced by the flavor intensity desired.

The fats to be used can also be selected to suit the intended end use. If fluid systems are desired, oils such as common vegetable oils, may be used. If plastic, firmer systems are desired, this can be achieved by adding saturated hard fats to the oils, by a total use of hard vegetable or animal fats, or by the use of hydrogenated fats or vegetable butters. Desirable properties and characteristics such as melting behavior, plasticity, unique flavor, and nutritional quality, all play a role in the selection of a suitable fat. It will be understood that it is within the capabilities of one skilled in the confection art to select the desired fat or oil, the present invention being concerned only with the novel caramel malt and fat composition. In characterizing the invention, the term fat will be used generically ot denote both fats and oils, and the ingredient will be defined further as a liquid or a solid at room temperature.

In addition to caramel malt and fat, it is generally desirable in most confection formulas to include sugar, salt and other adjuncts. The level of salt desired is generally in the vicinity of one fourth of 1% but this can be used to suit the taste. As much as 50% sugar can be used in caramel malt-fat formulations and evoke a favorable flavor response from some people. Generally, the addition of some sugar is desirable. In sweet coating formulations, the sugar content may vary from about 10 to about 60%. The sugar employed may be sucrose, glucose, corn sugar or any of such carbohydrate or synthetic sweetening products as are commercially available.

With reference to other adjuncts which are conventionally used for flavor influencing purposes, the composition may contain food acids such as phosphoric, citric, or tartaric acid; food alkalizers such as sodium bicarbonate, calcium oxide or hydroxide, magnesium oxide or hydroxide etc.; flavoring agents such as vanilla or vanillin; aromatic enhancers such as moltol, Palatone, Cyclotene; and preservatives such as monosodium glutamate. Dairy products such as milk solids, buttermilk solids and other milk base ingredients can also be employed to advantage as will be apparent to those skilled in the confectionery art. Small amounts of water can be added to the spreads to impart opaque appearance, lighten color, alter mouth-feel characteristics or carry in flavorants. The addition of water usually requires emulsifiers to facilitate incorporation and impart stability.

To provide further distinctive flavor compositions, known food substances such as chocolate or cocoa compositions and peanut butter may be mixed in varying proportions with the malt-fat compositions of the present invention. We have found, for example, that chocolate compositions such as those described in the aforesaid U.S. Patent No. 2,356,181 in conjunction with the caramel malt-fat compositions illustrative of the present invention can be employed. For example, we have found that if a caramel malt confection of the character described above is mixed with a chocolate confection of the type described in the aforesaid patent, that confections having flavors ranging from a distinctive chocolate flavor to confections having a distinctive caramel malt flavor can be obtained. The caramel malt-fat compositions may also be readily mixed in varying proportions with spreads such as peanut butter to produce distinctive peanut-butter-malt flavored spreads. In addition, the firm type malt-fat coatings may include nuts, confection chips and like additives.

The following examples illustrate the many compositions and confections which may be produced in accordance with the present invention.

*Example I*

Malt flour was prepared from caramel malt of different flavor intensity. The flavor intensity of the caramel malt is correlated with the color of the extract as determined by the American Society of Brewing Chemists Methods (A.S.B.C.). The malt flour was prepared by standard flour milling methods using a roller mill and sieve separation to achieve a particle size finer than 100 mesh and removal of malt hull. Particle size was further reduced by milling flours in a laboratory ball mill overnight.

Samples of coating were prepared using ground malt in the following formula:

100 parts of hard vegetable fat melting range 108–110° F., softening range 94–96° F.
80 parts of finely ground sugar (4X granulation)
10 or 15 parts of ground malt flour as indicated Fat was melted at 130° F. Malt and sugar were then added and thoroughly blended into the fat. The mixture was allowed to cool to 95° F., at which point stirring was initiated. Stirring was continued until marked thickening approaching a mushy consistency occurred, at which point the coating was poured into aluminum molds to solidify.

| Coating No. | Lovibond color of malt | Malt, percent | Flavor |
|---|---|---|---|
| 1 | 30 | 10 | Very mild, greasy. |
| 2 | 30 | 15 | Mild, butterscotchlike. |
| 3 | 45 | 10 | Do. |
| 4 | 45 | 15 | Mildly malty. |
| 5 | 75 | 10 | Do. |
| 6 | 75 | 15 | Strong malt after taste. |
| 7 | 300 | 10 | Pleasant mocha. |
| 8 | 300 | 15 | Strong mocha. |

It was observed that a range of flavor was obtainable by varying the type and amount of malt so as to produce mild, butterscotch-like flavors, malty flavors, and mocha flavors.

*Example II*

Malt coatings were prepared as in Example I. Commercial chocolate coatings were purchased representative of (1) light sweet chocolate, (2) milk chocolate, and (3) dark sweet chocolate. Chocolate coatings were then blended with malt coatings in amounts indicated below. For purposes of blending the chocolate and malt coatings were heated to 130° F., at which point they were blended together. They were then allowed to cool to 95° F., at which point they were stirred with an electric motor beater at slow speed until they thickened. The coatings were then poured into aluminum trays and allowed to solidify. In the following table reporting flavor and physical characteristics of coating mixtures, the ingredient malt coatings are numbered as in Example I. It was observed that the caramel malt composition blends so well with chocolate flavor that 15 to 30% of caramel malt coatings can be blended with chocolate coatings without diminishing the chocolate flavor intensity. The blended coatings were generally firm and glossy.

| Chocolate coating | | | Malt coating | | | |
|---|---|---|---|---|---|---|
| Type | Amount, percent | Amount, percent | 1 | 3 | 5 | 7 |
| Light sweet | 85 | 15 | No flavor change, color lightened, firm. | No flavor change, color lightened, firm. | Fuller flavor, color lightened, firm. | Slight mocha flavor, same color, firm. |
| | 70 | 30 | do | do | do | Mocha flavor, same color, firm. |
| Milk chocolate | 85 | 15 | Little flavor change, color lightened, firm. | Little flavor change, color lightened, firm. | Little flavor change, color lightened, firm. | Slight mocha, darkened, firm. |
| | 70 | 30 | Slight flavor loss, color lightened, firm. | Slight flavor loss, color lightened, firm. | Slight flavor loss, color lightened, firm. | Mocha flavor, color darkened, firm. |
| Dark sweet | 85 | 15 | Milder flavor, color lightened, soft. | Milder flavor, color lightened, soft. | Little flavor change, color lightened, soft. | Pleasant mocha, same color, soft. |
| | 70 | 30 | do | do | do | Good mocha, same color, soft. |

*Example III*

Malt coatings were prepared as in Example I. The coatings were then melted at 115° F. While held at this temperature, graham crackers, short bread cookies and marshmallows were dipped in the coating, drained and allowed to cool. The weight of coating applied amounted to 40% of graham cracker weight, 25% of cookie weight and 40% of marshmallow weight. Samples of the coated items were presented to a taste panel for rating. Panel judges scored the acceptability of the coated item on the following scale: 1—dislike extremely, 2—dislike very much, 3—dislike moderately, 4—dislike slightly, 5—neither like nor dislike, 6—like slightly, 7—like moderately, 8—like very much, and 9—like extremely. A rating of 7 from a diverse population of judges represents a high degree of food acceptability.

Coatings are numbered as presented in Example I.

| Coating No. | Crackers | Hedonic ratings— | |
|---|---|---|---|
| | | Cookies | Marshmallows |
| 4 | 6.2 | 6.3 | 6.1 |
| 6 | 6.6 | 6.9 | 6.5 |
| 8 | 5.7 | 5.55 | 5.8 |

*Example IV*

Coatings were prepared as in Example I. A portion of the coating, however, was removed and ¼% of vanillin added. In another portion, .05% of finely powdered salt was added. Samples of the finished coatings were presented to a taste panel as in Example III.

| Coating type | Additive | Hedonic rating |
|---|---|---|
| 4 | None | 5.4 |
| 4 | 0.05% salt | 5.7 |
| 2 | None | 5.7 |
| 2 | 0.25% vanillin | 6.1 |
| 6 | None | 6.0 |
| 6 | 0.25% vanillin | 6.5 |

*Example V*

A malt coating was prepared similar to coating 4 of Example I. A 200 g. sample of commercial puffed wheat cereal was placed in the bowl of a Hobart mixer and brought to 100° F. Fifty grams of coating were then melted at 115° F. The puffed wheat in the bowl was then placed in the mixer, a whip beater inserted and run at slow speed. While the warm cereal was thus agitated, the molten malt coating was sprayed on. After cooling, the cereal product was found to have a partial coating which imparted a most acceptable flavor.

*Example VI*

Plastic malt spreads of the consistency of peanut butter were prepared with the following formula:

45 parts of malt flour micro-pulverized so that more than 95% passed a 150 mesh sieve
8 parts confectioners 10X powdered sugar
5 parts milk powder
1.5 parts fine pulverized salt
1 part sodium bicarbonate
50 parts hydrogenated vegetable fat
  (M.P. 104° F.) blended with an equal part of peanut oil The dry ingredients were mixed well and the melted fat was then added. The process of mixing was continued as the fat cooled, so that it accomplished some working of the fat. The product was of tan to brown color with appealing caramel malt flavor. The finished spread was presented to a taste panel both alone and applied on crackers, and the following taste judgements were obtained, rated on the scale given in Example III. Such spreads can be used alone as bread spreads, sandwich fillings, snack spreads or dips, or in admixture with peanut butter, margarine, or other fatty spreads.

| Spread | Lovibond color of malt | Hedonic ratings | |
|---|---|---|---|
| | | Alone | On crackers |
| 1 | 2 | 4.63 | 4.75 |
| 2 | 30 | 5.25 | 5.25 |
| 3 | 45 | 4.50 | 4.75 |
| 4 | 75 | 4.75 | 5.15 |

*Example VII*

100 grams of a commercially purchased milk chocolate coating was blended with 3% of light caramel malt, 2° Lovibond color, known as dextrin malt. The technique of blending was as described in Example II. The product was lightened in color and made mild in flavor comparable to a malted-milk, chocolate composition.

We claim as our invention:

1. A stiff plastic edible caramel malt confection coating composition consisting essentially of from about 1% to about 50% caramel malt flour having a color between about 2° and about 300° Lovibond, and having a particle size range such that about 99% of the particles will pass through a 200 mesh screen, about 95% of the particles will pass through a 326 mesh screen and about 1% of the particles will pass through a 100 mesh screen, about 30% to about 50% of a vegetable fat having a melting range of from about 108 to about 110° F. and a softening range from about 94 to about 96° F., and about 10% to about 60% finely ground sugar having a particle size between about 5 and about 25 microns.

2. A process of making a plastic confection comprising caramelizing malt berries to a Lovibond color between about 2° and about 300°, milling the caramelized berries to produce a caramel malt flour substantially free from hull fragments and having a particle size range such that about 99% of the particles will pass through a 200 mesh screen, about 95% will pass through a 325 mesh screen, and about 1% will pass through a 100 mesh screen; mixing said malt flour with a vegetable fat having a melting range of from about 108° F. to about 110° F. and a softening range of from about 94° F. to about 96° F. and with finely ground sugar having a particle size between about 5 and about 25 microns, in amounts such that the confection contains from about 1% to about 50% malt flour, from about 30% to about 50% fat, and from about 10% to about 60% sugar, said mixing being carried out at a temperature above the melting range of said fat while thoroughly blending said malt, fat and sugar; and cooling said mixture to form a solid plastic edible confection.

3. A process of making a plastic confection comprising caramelizing malt berries to a Lovibond color between about 2° and about 300°, milling the caramelized berries to produce a caramel malt flour substantially free from hull fragments and having a particle size range such that about 99% of the particles will pass through a 200 mesh screen, about 95% will pass through a 325 mesh screen, and about 1% will pass through a 100 mesh screen; mixing said malt flour with a vegetable fat having a melting range of from about 108° F. to about 110° F. and a softening range of from about 94° F. to about 96° F., with finely ground sugar having a particle size between about 5 and about 25 microns, with adjuncts and with a flavor substance other than caramel malt, said mixing being carried out at a temperature above the melting range of said fat while thoroughly mixing said malt, fat, sugar, adjuncts and flavor substance; and cooling said mixture to form a solid plastic edible confection.

4. A process of making a plastic confection comprising caramelizing malt berries to a Lovibond color between about 2° and about 300°; milling the caramelized berries to produce a caramel malt flour substantially free from hull fragments and having a particle size range such that about 99% of the particles will pass through a 200 mesh screen, about 95% will pass through a 325 mesh screen, and about 1% will pass through a 100 mesh screen; mixing said malt flour with a vegetable fat having a melting range of from about 108° F. to about 110° F. and a softening range of from about 94° F. to about 96° F., said mixing being carried out at a temperature above the melting range of said fat while thoroughly blending said malt and fat; and cooling said mixture to form a solid plastic edible confection.

References Cited in the file of this patent

UNITED STATES PATENTS

| | | |
|---|---|---|
| 491,813 | Rahr | Feb. 14, 1893 |
| 722,807 | Burckett | Mar. 17, 1903 |
| 737,432 | Meinl | Aug. 25, 1903 |
| 857,445 | Clarke | June 18, 1907 |
| 1,043,839 | Hunter | Nov. 12, 1912 |
| 1,658,027 | Bosworth | Feb. 7, 1928 |
| 2,122,016 | Stokes | June 28, 1938 |
| 2,129,881 | Schildberger | Sept. 13, 1938 |
| 2,511,119 | Mitchell | June 13, 1950 |

OTHER REFERENCES

"Brewing Sciences and Practices" by H. Lloyd Hind, vol. I, Chapman and Hall, Limited, 1950, page 214.